United States Patent Office 3,063,986
Patented Nov. 13, 1962

3,063,986
PROCESS FOR THE PRODUCTION OF Δ,Δ UN-SATURATED LACTAMS OF ω-AMINODODECA-NOIC ACIDS
Günther Wilke and Hermann Wesslau, Mulheim-Ruhr, Germany, assignors to Studiengesellschaft Kohle m.b.H., a corporation of Germany
No Drawing. Filed July 15, 1960, Ser. No. 43,011
Claims priority, application Germany July 18, 1959
10 Claims. (Cl. 260—239.3)

This invention relates to a process for the production of lactams of ω-aminododecanoic acid having two unsaturated double bonds.

German Patents Nos. 1,050,333 and 1,043,329 disclose processes which permit smooth trimerization of butadiene to form cyclododecatrienes. Belgian Patent No. 567,041 discloses a process for the selective epoxidation of cyclododecatrienes to form monoepoxides which, by the process of Belgian Patent No. 577,085, can be catalytically converted into ketones containing two unsaturated double bonds.

It has now been found that the oximes of the different cyclododecadienones can be rearranged in the presence of acid chlorides and under mild conditions to form the 13 membered lactams containing two double bonds in the ring. Since the epoxidation of trans,trans,cis-cyclododecatriene involves the preferential conversion of a trans-double bond, there is obtained in this case, starting from the corresponding oxime, a lactam which contains one trans- and one cis-double bond while the reaction product obtained from all trans-cyclododecatriene contains two trans-double bonds.

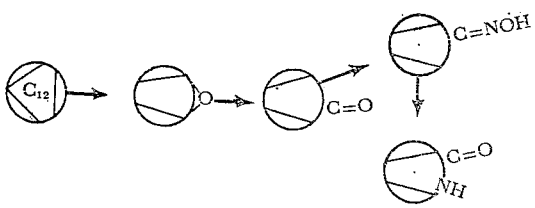

While the course of the reaction shown for the all-trans-cyclododecatriene leads to a sterically uniform compound, the same succession of reaction in case of the trans,trans,cis-cyclododecatriene results in a mixture of stereoisomeric lactams since both the rearrangement of the epoxide and the Beckmann rearrangement may proceed towards the cis-double bond or the trans-double bond. When hydrogenating the double bonds of the different unsaturated lactams obtained in accordance with the invention, the same saturated 13-membered lactam is formed in any case.

The process of the invention is carried out under mild reaction conditions with the oximes being preferably introduced into a mixture of liquid sulfur dioxide and thionyl chloride. The liquid sulfur dioxide is preferably used at atmospheric pressure. However, a superatmospheric pressure and elevated temperatures may be used. Upon completion of the reaction, the sulfur dioxide is evaporated and the residue worked up in known manner.

Up to the present, such a rearrangement of oximes has been effected only with saturated oximes. It could not be predicted from the prior art that smooth rearrangement is also obtainable when using cyclododecadienone oximes as the starting material without the double bond being affected by the rearrangement catalysts. Exactly the contrary had to be expected from the prior art since, as is known, the carbon skeleton of the cyclododecatrienes, e.g. in the reaction with carbon monoxide and water, undergoes irreversible changes in the presence of similar acid catalysts such, for example, as boron fluoride hydrate, i.e. although one double bond can be utilized for the addition of carbon monoxide, the two remaining double bonds disappear due to trans-annular ring closures.

The lactams having 13 ring members and two unsaturated double bonds are hitherto unknown valuable monomers for the production of novel unsaturated polyamides.

Example 1

89 gms.=0.5 mol of cyclododecadiene epoxide obtained from trans,trans,cis-cyclododecatriene are mixed with an ethereal solution of 2.78 gms.=0.01 mol of magnesium iodide. The ether is slowly distilled off. When the temperature in the still has reached 80° C., a spontaneous reaction starts which is accompanied by an increase in temperature to about 100° C. Upon termination of the spontaneous reaction, the reaction mixture is heated for further 2 to 3 hours at 95 to 100° C. Upon cooling, the mixture is dissolved in pentane and the organic phase is successively washed with dilute sulfuric acid, thiosulfate solution, water, bicarbonate solution, and the solution is then dried over ignited sodium sulfate. The solvent is distilled off and the residue is purified by distillation in vacuo. The cyclododecadienone boils at 96–98° C./2 mm. Hg. $n_D^{20}=1.5066$. The yield is 80 gms.=90% of the theoretical yield.

80 gms. of the unsaturated ketone are reacted in conventional manner in alcohol with hydroxylamine hydrochloride in the presence of potassium carbonate. The oxime containing two unsaturated double bonds is obtained in amount of 75 grams corresponding to 87% of the theoretical yield. The melting point of the product is 116–117° C. Upon recrystallization from alcohol, the melting point of the pure substance is 120.5° C.

100 ml. of liquid sulfur dioxide are cooled to $-30°$ C. and mixed with 20 ml. of thionyl chloride. To this mixture are added 45 gms. of the unsaturated oxime in portions with continued cooling. When the addition is finished, the sulfur dioxide is evaporated. The residue represents a faintly yellow syrup which is poured on ice. The solution is adjusted to about pH 10 by means of a caustic solution. The mixture is treated with ether and the ethereal solution is washed, dried and evaporated. The residue is recrystallized from a 1:3 mixture of cyclohexane and hexane. There are obtained 36 gms. of colorless needles having a melting point of 106–107° C. The yield is 80%. The lactam obtained upon evaporation of the ether may also be purified by distillation, which results in 33 gms.=73% of the theoretical yield. Boiling point, 106–110° C./0.01 mm. Hg.

Example 2

The procedure is the same as described in Example 1 except that the monoepoxide of all-trans-cyclododecatriene is charged to the reaction.

Obtained from 89 gms. of trans,trans-cyclododecadiene epoxide are 82 gms.=92% of the theory of trans,trans-cyclododecadienone having a boiling point of 86–88° C., a melting point of 10.5–11° C. and a refractive index, $n_D^{20}$, of 1.5015.

The trans,trans-cyclododecadienone is converted into the oxime by the procedure described in Example 1. The pure oxime has a melting point of 119.5° C.

45 gms. of trans,trans-cyclododecadienone oxime processed in the manner described above result in 38 gms. of the lactam containing two unsaturated double bonds, the product being in form of colorless needles having a melting point of 124° C. The yield is 85% of the theoretical yield.

What we claim is:
1. A process for the production of lactams of ω-aminododecanoic acid having two double bonds which com- prises contacting an oxime of cyclododecadienone derived from epoxidized cyclo dodecatri-(1,5,9)-ene with an acid chloride under mild reaction conditions, and recovering the resulting 13-membered lactam of ω-amino dodecanoic acid having two double bonds thereby formed.

2. Process according to claim 1, which comprises contacting said oxime with a mixture of liquid sulfur dioxide and thionyl chloride.

3. Process according to claim 1, wherein said oxime is derived from epoxidized trans,trans,cis-cyclododecatri-(1,5,9)-ene.

4. Process according to claim 1 wherein said oxime is derived from epoxidized trans,trans,trans-cyclododecatri-(1,5,9)-ene.

5. Process according to claim 1, wherein said oxime is cyclododeca-5,9-diene-one-(1)-oxime.

6. Process according to claim 1, wherein said oxime is cyclododeca-4,8-diene-one-(1)-oxime.

7. Lactam of ω-aminododecanoic acid having two double bonds prepared by contacting an oxime of cyclododecadienone derived from epoxidized cyclododecatri-(1,5,9)-ene with an acid chloride under mild reaction conditions.

8. Lactam of ω-aminododecanoic acid having two double bonds prepared by contacting an oxime of cyclododecadienone derived from epoxidized trans,trans,cis-cyclododecatri-(1,5,9)-ene having a melting point of 106–110° C./0.01 mm. Hg.

9. Lactam of ω-aminododecanoic acid having two double bonds prepared by contacting an oxime of cyclododecadienone derived from epoxidized trans,trans,trans-cyclododecatri-(1,5,9)-ene having a melting point of 124° C.

10. A process for the production of a lactam of ω-amino-dodecanoic acid having two double bonds which comprises contacting trans,trans - cyclododecadienone oxime derived from epoxidized trans,trans,trans-cyclododecatri-(1,5,9)-ene with a mixture of sulfur dioxide and thionyl chloride, evaporating the sulfur dioxide and recovering the lactam of ω-aminododecanoic acid thereby formed.

References Cited in the file of this patent

FOREIGN PATENTS 172,873    Switzerland _____ Oct. 31, 1934

OTHER REFERENCES

Ruzicka et al.: Helv. Chimica Acta, vol. 32, pp. 544–52 (1949).

Gould: Structure and Mechanism in Organic Chemistry, pp. 618–21 (1959) (Holt-Dryden).